United States Patent [19]
Geiger

[11] Patent Number: 5,937,488
[45] Date of Patent: Aug. 17, 1999

[54] BRAKELINE TO AXLE CLAMP

[75] Inventor: Gerard G Geiger, Jackson, Wis.

[73] Assignee: Tyton Hellerman Corporation, Milwaukee, Wis.

[21] Appl. No.: 09/114,559

[22] Filed: Jul. 13, 1998

[51] Int. Cl.⁶ .............................. B65D 63/00; F16L 3/22
[52] U.S. Cl. .......................... 24/339; 248/74.3; 24/16 PB
[58] Field of Search .............................. 24/336, 339, 326, 24/376, 464, 489, 543, 562, 271, 20 TT, 16 PB, 30.5 R, 30.5 P; 248/74.1, 74.2, 68.1; 403/397, 391, 385, 389

[56] References Cited

U.S. PATENT DOCUMENTS

| | | | |
|---|---|---|---|
| 3,526,934 | 9/1970 | Owen, Sr. ........................ | 248/68.1 X |
| 3,954,238 | 5/1976 | Nivet ........................................ | 248/68.1 |
| 4,526,756 | 7/1985 | Wong ................................ | 24/16 PB X |
| 4,835,824 | 6/1989 | Durham et al. ............................ | 24/339 |
| 4,881,301 | 11/1989 | Sweenet et al. ...................... | 24/30.5 R |
| 5,653,411 | 8/1997 | Picco et al. ............................ | 24/339 X |
| 5,775,653 | 7/1998 | Hornet et al. ....................... | 248/74.3 X |
| 5,806,819 | 9/1998 | Martone ............................. | 248/74.3 X |
| 5,820,048 | 10/1998 | Shereyk et al. ......................... | 248/68.1 |

*Primary Examiner*—James R. Brittain
*Assistant Examiner*—Robert J. Sandy
*Attorney, Agent, or Firm*—Ryan Kromholz & Manion, S.C.

[57] ABSTRACT

A unitary clamp is provided for securing a brakeline to the axle of a vehicle. The clamp includes a first clamping structure that clamps around the axle and a second clamping structure that clamps around the brakeline. Both clamping structures are independently operated so that the clamp can first be secured to the brakeline and thereafter to the axle.

12 Claims, 6 Drawing Sheets

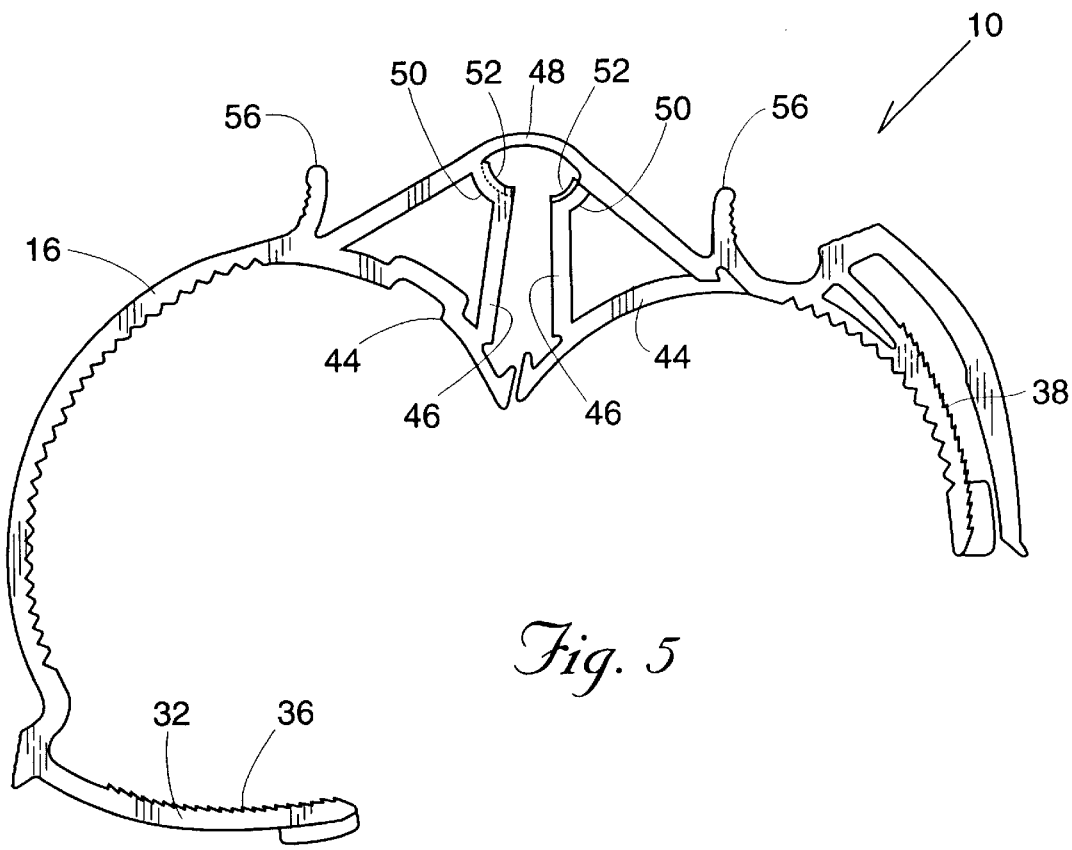
Fig. 5
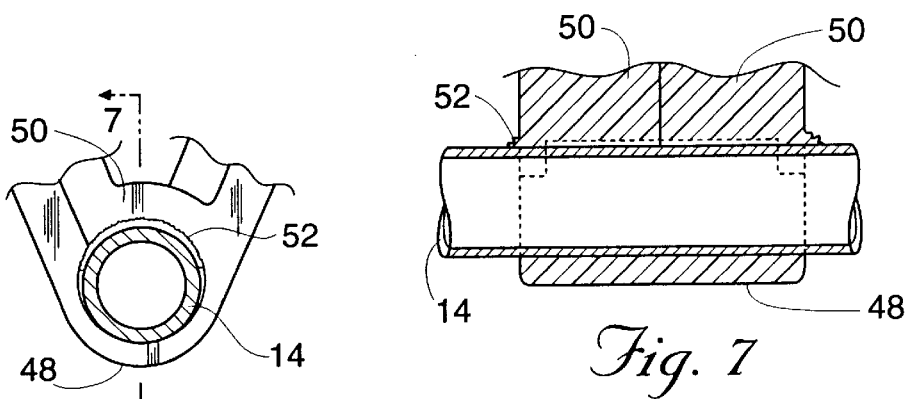
Fig. 6
Fig. 7
Fig. 8

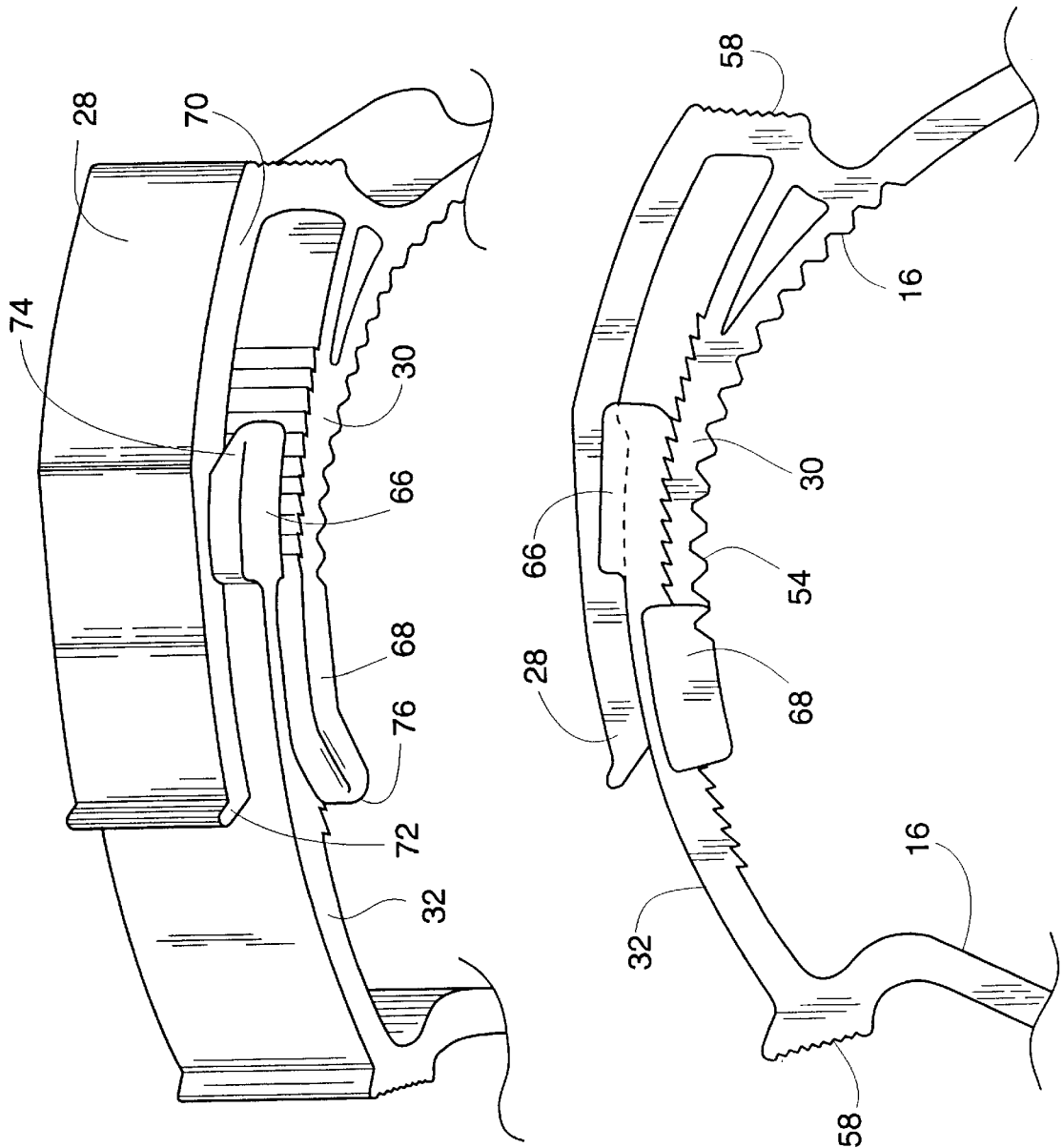

5,937,488

BRAKELINE TO AXLE CLAMP

BACKGROUND OF THE INVENTION

This invention relates generally to plastic clips and clamps and, more generally, to a unitary structure for securing an elongate tubular element, such as a brakeline, to a supporting structure, such as a vehicular axle.

Plastic clips and clamps of various types have been developed to simplify and speed manufacturing operations. Appropriately designed clips and clamps can often be used in place of traditional brackets, nuts, bolts and washers. Frequently, it is easier and faster to use an appropriately designed plastic clip or clamp to secure one item to another than it is to use a bracket, nut and bolt. It is often more economical as well, particularly in high volume situations where the cost of initial design and tooling is amortized over a large number of pieces.

Plastic clips and clamps are particularly well suited for use in automotive and truck applications wherein they are used to secure wires, hoses and other elements to each other and to a vehicle frame. The advantages of using plastic clips and clamps in such applications include speed of assembly, low cost, low weight, vibration damping and freedom from rusting and corrosion.

Plastic clips and clamps are especially well suited for mounting a brakeline to the axle of a truck, car or other vehicle. Clips and clamps used in such an application must meet rigorous requirements. Obviously, it is important that the clip or clamp mount the brakeline securely enough to withstand the shocks and vibration of vehicular applications. Similarly, brakelines and axles are often part of the exposed underside of a vehicle and are constantly bombarded with rocks, gravel, water, salt, slush, petroleum products etc. Accordingly, the clips and clamps must be able to withstand such a harsh environment for a long time, and in most cases, substantially the entire life of the vehicle.

In addition to performance requirements, clips and clamps used to secure brakelines to axles should preferably address manufacturing concerns as well. The clips and clamps should be capable of economical manufacture and should facilitate assembly of the vehicle on which they are used. All of these considerations should be taken into account in designing a plastic clip or clamp for securing a brakeline, or other such element, to a vehicle axle or other such structure.

One known type of clamp that is particularly well-suited for use in clamping around a cylindrical structure, such as an axle, is shown in U.S. Pat. No. 5,216,784, commonly owned by the assignee hereof. In this clamp, a pair of interlocking jaws are provided at the ends of an open-ended loop. After the loop is placed around a structure, the interlocking jaws are squeezed together to tighten the loop. A plurality of interlocking teeth prevent withdrawing movement of the jaws, and appropriately positioned tabs or fins along the sides of the jaws prevent lateral displacement of the jaws. Although effective as a clamp for securing wires, cables or conduits into a bundle, the conduit clamp made no provision for securing or mounting a first elongate member, such as a brakeline, alongside of another structure, such as an axle.

SUMMARY OF THE INVENTION

The invention provides a clamp for supporting an elongate element adjacent and spaced from a primary supporting member. The clamp includes a flexible band having first and second end portions shaped and dimensioned to encircle the primary supporting member and further includes substantially symmetrical interlocking support legs positioned between and integrally formed with the first and second end portions. The interlocking support legs are shaped and dimensioned to encircle the elongate element. The clamp further includes a secondary latch structure integrally formed on the interlocking support legs for securing the support legs to each other to secure the support legs to the elongate element. The clamp further includes a primary latch structure integrally formed on the first and second end portions for securing the first and second end portions to each other to secure the flexible band around the primary supporting member with the elongate element supported by the interlocking support legs spaced from the primary supporting member.

It is an object of the invention to provide a new and improved clamp for clamping an elongate secondary element adjacent to, and spaced from, a primary supporting structure.

It is a further object of the invention to provide a new and improved clamp for clamping a brakeline to the axle of a vehicle.

It is a further object of the invention to provide a brakeline to axle clamp that is easily installed onto both the brakeline and the axle.

It is a further object of the invention to provide a brakeline to axle clamp that can be mounted onto the brakeline before installation of the brakeline onto the axle.

It is a further object of the invention to provide a brakeline to axle clamp that is easily manufactured in a single molding operation.

It is a further object of the invention to provide a brakeline to axle clamp that is durable and effective in securing the brakeline to the axle with great reliability.

It is a further object of the invention to provide a brakeline to axle clamp that is effective in isolating the brakeline from vibrations occurring in the vehicle during use.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 5 is a side elevation view of the brakeline to axle clamp showing the clamp in the initial stages of being brought toward the closed position.

FIG. 6 is a fragmentary side view of the brakeline clamp portion of the clamp after it is closed onto a brakeline.

FIG. 7 is a cross-sectional view of the brakeline clamp portion shown in FIG. 11 taken along line 7—7 thereof and showing the crush tabs of the brakeline clamp portion compressing against the brakeline confined therein.

FIG. 8 is a cross-sectional view similar to FIG. 7, but without a brakeline confined therein, showing the crush tabs in an uncrushed condition.

FIG. 9 is partial perspective view of the axle clamp portion of the clamp showing the configuration and arrangement of the anti-release tabs provided thereon.

FIG. 10 is a partial side elevation view of the axle clamp portion of the clamp showing further showing configuration and arrangement of the anti-release tabs.

DESCRIPTION OF THE PREFERRED EMBODIMENT

Figure 2:
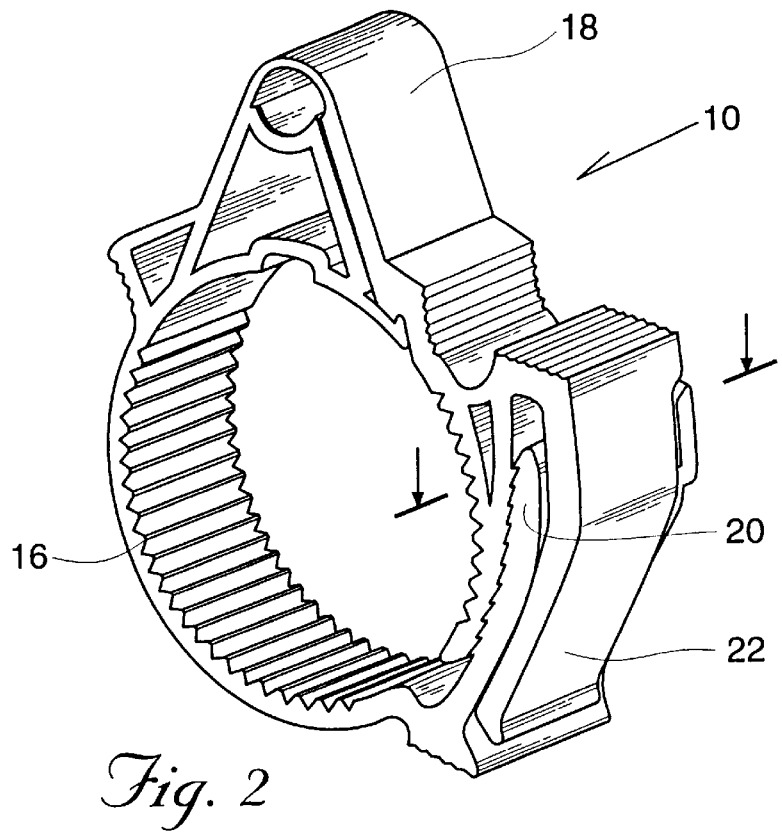
FIG. 2 a perspective view of the brakeline to axle clamp showing the clamp in a closed position.
Figure 1:
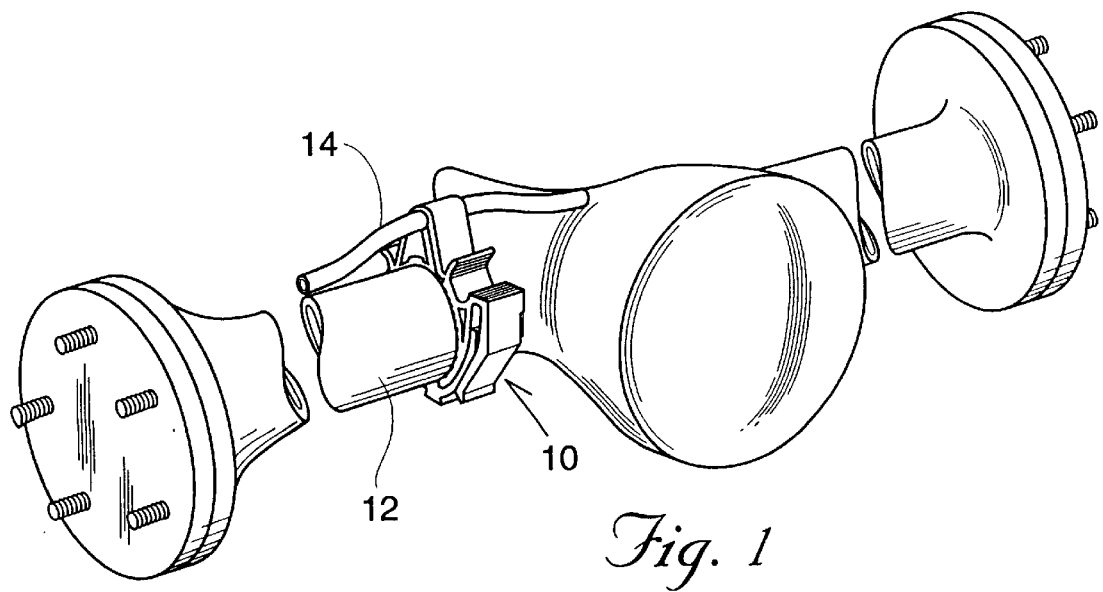
FIG. 1 is a perspective view of a vehicle axle wherein a brakeline is mounted to the axle using brakeline to axle clamp constructed in accordance with various features of the invention.

Referring to the drawings, and in particular to FIG. 1, a brakeline to axle clamp 10 embodying various features of the invention is shown mounted in place on a vehicular axle 12. As illustrated, the brakeline to axle clamp 10 functions to secure a brakeline 14 in spaced relationship to the axle 12. In broader terms, however, it will be appreciated that securing a brakeline in this fashion is only one of the functions that can be performed, and that the invention generally functions to secure an elongate, secondary element, such as the brakeline 14, adjacent and spaced from a primary supporting member, such as the axle 12.

The brakeline to axle clamp 10 is advantageous in several respects. Preferably, it is configured so that it can first be installed onto the brakeline 14 and thereafter installed onto the axle 12. If desired, the brakeline to axle clamp 10 can be mounted onto the brakeline 14 well in advance of installing onto the axle 12. This means that the clamps 10 can be installed onto the brakeline 14 at one point in a manufacturing operation and conveniently handled as a unit until both are installed onto the axle 12 at a later step in manufacture. Additionally, the clamp 10 is designed to hold the brakeline 14 firmly and securely adjacent the axle 12 for a period of years in the harsh and hostile environment of a vehicle's undercarriage. The clamp 10 functions to hold the brakeline securely without crushing or otherwise damaging the easily deformable brakeline 14. The clamp 10 is also configured to accommodate axles 12 of various sizes. This enables a single clamp design to be used in a variety of applications. Finally, the clamp is designed to be easily and economically formed from a durable plastic, such as heat stabilized, high impact Nylon 6/6. Economy of manufacture is an important consideration when it is recognized that millions of vehicles are manufactured each year and that even small price differentials become significant.

Referring further to FIGS. 1–5, the clamp 10 comprises a flexible band portion 16 that encircles the axle 12, and an offset portion 18 (FIG. 2) that supports the brakeline 14. The flexible band 16 includes first and second end portions 20 and 22, while the offset portion 18 includes a pair of substantially symmetrical interlocking support legs 24 and 26. A primary latch structure is provided for securing the first and second ends 20, 22 of the band 16 to each other and thereby secure the band 16 around the axle 12. A secondary latch structure is provided for securing the support legs 24 and 26 to each other and around the brakeline 14. Preferably, all these structures are integrally formed, and the clamp 10 is molded as a unitary structure in a single manufacturing step.

In the illustrated embodiment, the primary latch structure takes the form of a pair of opposed jaws 28 and 30 formed at one end (e.g., second end 22) of the band 16, and an interlocking tab or beam 32 formed at the other end 20. The jaws 28 and 30 are generally parallel (i.e., concentrically offset) to each other and are biased to closely engage the beam 32 when it is inserted between the jaws. Preferably, the underside of the beam 32 is provided with a plurality of serrations or teeth 36 that interlock with complementary teeth 38 formed on the upper side of the lower jaw 30 to permit insertion of the beam 32 between the jaws 28 and 30, but to resist withdrawal of the beam 32 from between the jaws after insertion. A suitable and similar clamping arrangement is shown in U.S. Pat. No. No. 5,216,784, commonly owned by the assignee hereof, the specification of which is incorporated by reference herein.

Figure 4:
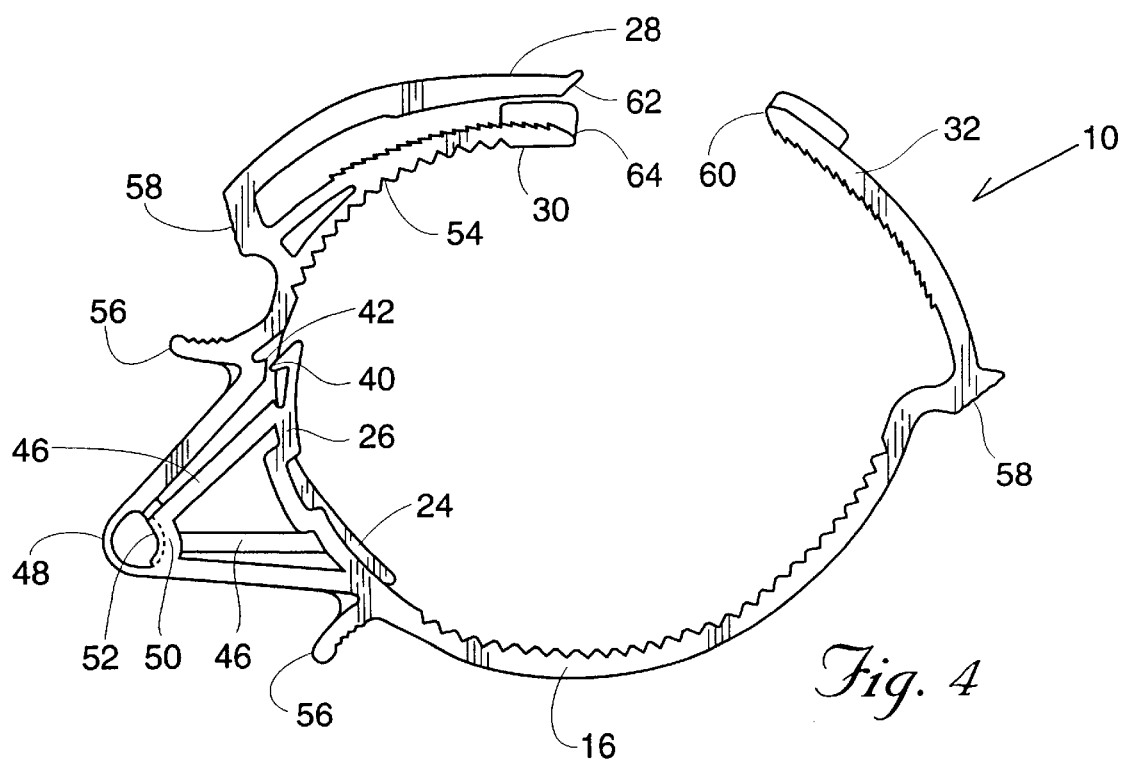
FIG. 4 is a side elevation view of the brakeline to axle clamp showing the brakeline clamp portion of the clamp approaching a closed position with axle clamp portion of the clamp still in an open position.
Figure 11:
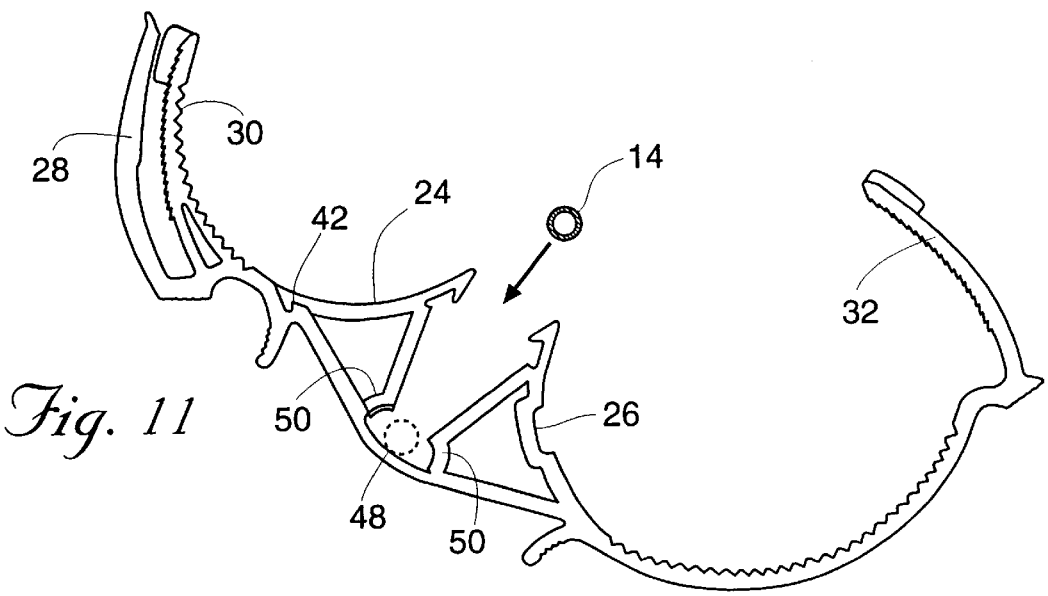
FIGS. 11–15 are sequential side elevation views of the brakeline to axle clamp showing the clamp first being secured around a brakeline and then being secured around an axle to secure the brakeline in spaced relationship to the axle.
Figure 14:
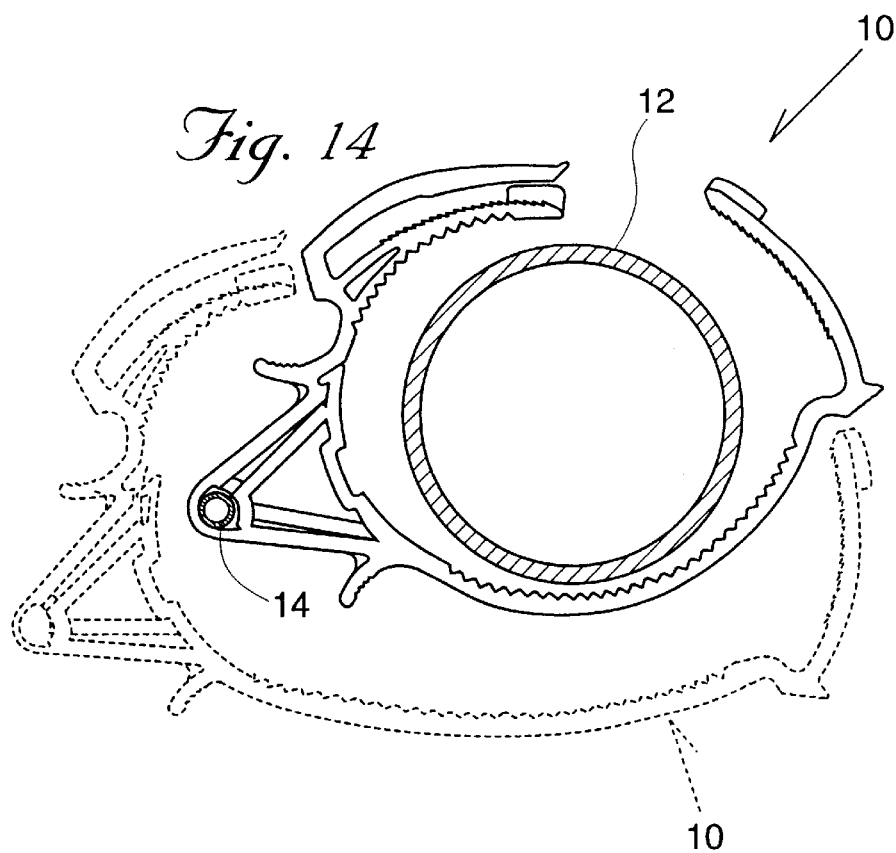
Figure 15:
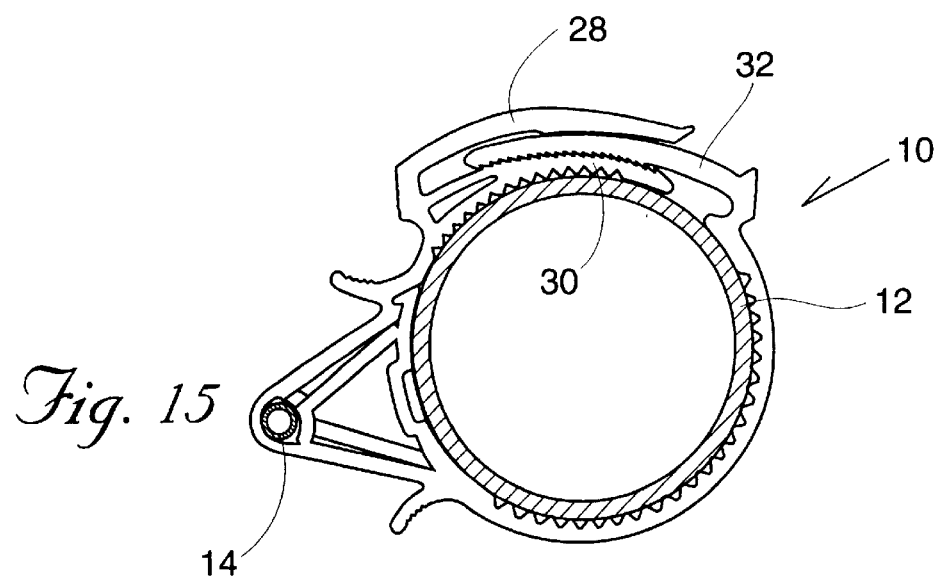

The secondary latch structure preferably takes the form of a hook or barb 40 that is formed at the end of each support leg 24, 26 and that hooks into a complementary notch or pocket 42 formed adjacent the base of the opposite leg. Preferably, the forward face of each hook 40 is beveled so as to cause each hook 40 to ride up and into the complementary pocket 42 when the support legs 24 and 26 are closed together as best seen in FIG. 4. When the support legs 24 and 26 are brought fully together, the hooks 40 snap into the respective notches 42 as best seen in FIGS. 4 and 14. It will be appreciated that, once the hooks 40 are received in the pockets 42, separating movement of the support legs 24 and 26 relative to each other is prevented. It will further be appreciated that such separating movement is prevented regardless of whether the primary latch, (i.e., jaws 28, 30 and beam 32) is or is not engaged. In this manner, the secondary latch operates independently of the primary latch.

Figure 3:
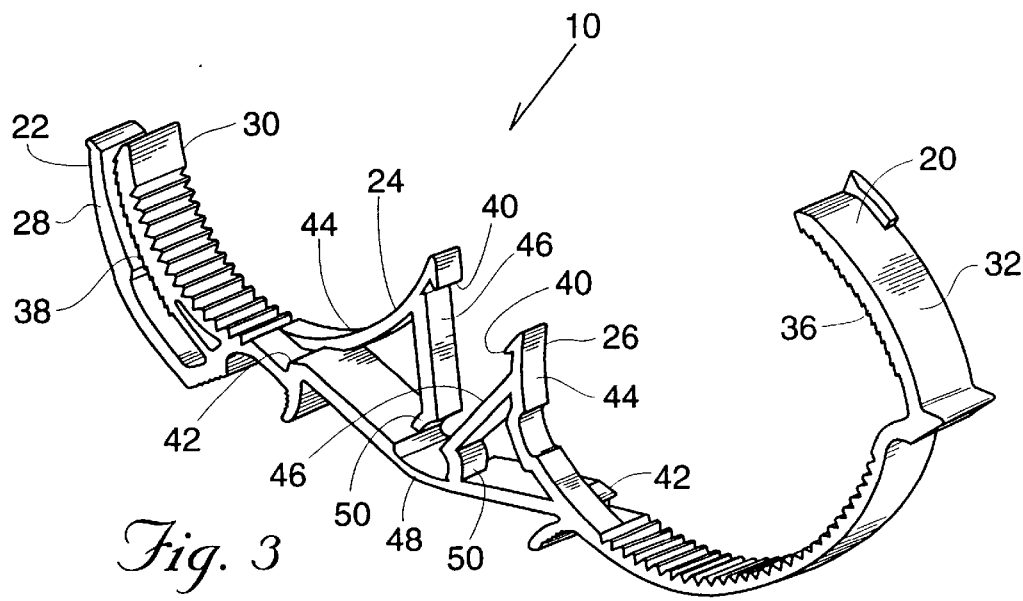
FIG. 3 is a perspective view of the brakeline to axle clamp in a fully open, as molded, position before use.

Referring further to FIGS. 3–5, each of the support legs 24 and 26 includes an upswept portion 44 that terminates in the hook 40, and a brace portion 46 that slants downwardly toward the midpoint of the strap 16. At the midpoint, the strap 16 includes a flexible hinge portion 48 that wraps around the brakeline 14 when the support legs 24 and 26 are snapped together. Additionally, each of the braces 46 includes a collar portion 50 that is shaped to conform to the exterior surface of the brakeline 14 when the brakeline 14 is positioned between the collar portions 50 and the hinge 48 and the support legs are thereafter snapped together. When the support legs 24 and 26 are snapped together, the hinge portion 48, and the two collar portions 50 define a substantially cylindrical, close-fitting channel through which the brakeline 14 extends.

As best seen in FIGS. 4–8, the interior surface of each collar portion 50 includes a crush tab 52 that comprises an inwardly directed, narrow tab and that compresses against the exterior of the brakeline 14 when the support legs 24 and 26 are closed around the brakeline. Preferably, the height of the crush tabs 52 sufficiently great as to ensure that they engage the exterior of the brakeline 14 given the expected variations in brakeline dimension and the manufacturing tolerances of the clamp 10. As best seen in FIGS. 6 and 7, the crush tabs 52 simply deform to a greater or lesser degree as needed to ensure a snug fit against the brakeline 14, regardless of minor variations in the actual clearance between the brakeline 14 and the clamp 10. Preferably, one or more crush tabs 52 are formed on the interior of each collar portion 50.

Preferably, the upswept portions 44 of the support legs 24 and 26 are curved to match the expected curvature of the strap 16 when it is installed onto the axle 12. Additionally, the thickness of the support legs 24 and 26 is such as to permit flexing as further needed to allow the strap 16 to conform snuggly around the axle 12. Accordingly, when the support legs 24 and 26 are snapped together around the brakeline 14, the upswept portions 44 of the legs 24 and 26 together define a substantially, continuous, arcuate surface along the inside of the strap 16. To improve the grip between the clamp 10 and the axle 12, the interior surface of each end of the strap 16 includes a plurality of transverse anti-rotation serrations or ridges 54 that deform slightly against the axle 12 and thereby increase friction between the clamp 10 and the axle 12.

To facilitate closure of the support legs 24 and 26 around the brakeline, a pair of outwardly swept, opposed finger tabs or grips 56 (FIG. 4) are formed adjacent the bases of the legs 24 and 26. The finger tabs 56 preferably include a serrated outer surface and, as best seen in FIG. 4, can be squeezed together to close the legs into each other and cause the hooks 40 to engage the pockets 42. The finger tabs 56 are preferably large and long enough to enable the legs 24 and 26 to be snapped together manually. Alternatively, a tool, such as a pliers, can be used to squeeze the tabs 56 and thereby engage the legs.

Similarly, an additional pair of serrated tool or finger grips 58 are formed at the opposed bases of the jaws 28, 30 and the beam 32. These tabs 58, which also include exterior serrations, are used to squeeze the beam 32 between the jaws 28 and 30 to thereby tighten the clamp 10 around the axle. Again, the clamp 10 can be tightened manually onto the axle. However, given the need to achieve a secure installation and avoid movement, the clamp 10 is preferably tightened with a suitable tool, such as a channel-lock pliers or specialized power tool, that engages the tabs 58 and squeezes them together to drive the beam 32 deeper between the jaws 28 and 30.

To ease installation, the forward edge 60 of the beam 32 is beveled, as are the forward edges 62 and 64 of the upper and lower jaws 28 and 30. Beveling the edges in this manner eases installation by automatically spreading the jaws 28 and 30 as the beam 32 is inserted therebetween.

To prevent inadvertent release of the clamp 10 from the axle 12, the jaws 28 and 30, and the beam 32 are preferably provided with a pair of upper and lower anti-release features 66 and 68 (FIGS. 9 and 10) that function to prevent lateral movement of the beam 32 relative to the jaws 28 and 30 after these elements are engaged. The anti-release features 66 and 68 are formed on the same side edges of the beam 32 and lower jaw 30, respectively. The lower anti-release feature 68 formed on the lower jaw 30 extends upwardly alongside the beam 32 and functions to keep the beam 32 from moving laterally in a first direction (i.e., downwardly as viewed in FIG. 9) relative to the jaws 28 and 30. The upper anti-release feature 66 formed on the beam 32 projects upwardly alongside the edge of the upper jaw 28 and functions to keep the beam 32 from moving laterally in the opposite direction (i.e., upwardly as viewed in FIG. 9) relative to the jaws 28 and 30. In this manner, the anti-release features 66 and 68 prevent sideways movement of the beam 32 relative to the jaws 28 and 30 while permitting the beam 32 to move inwardly between the jaws 28 and 30.

As best seen in FIG. 9, the side edge 70 of the upper jaw 28 adjacent the anti release feature 66 is preferably relieved or cut away in order to provide clearance for the upper anti-release feature 66. Additionally, the forward side edge corner 72 of the upper jaw 28 is chamfered, as are the forward corner 74 of the upper anti-release feature 66 and the forward corner 76 of the lower anti-release feature 68. By chamfering these edges in this manner, the beam 32 is automatically directed into proper axial alignment with the jaws 28 and 30 as it is inserted between the jaws.

The manner in which the clamp 10 is installed onto a brakeline 14 and then onto an axle 12 is best seen in FIGS. 11–15.

First, and with the clamp 10 in a fully opened position, the brakeline 14 is inserted into the area above the hinge 48 and between the collar portions 50. One attribute of the clamp 10, and in particular the symmetrical configuration of the support legs 24 and 26, is that the space therebetween can be opened fully, to permit unimpeded and simple insertion of the brakeline 14 therein.

Figure 12:
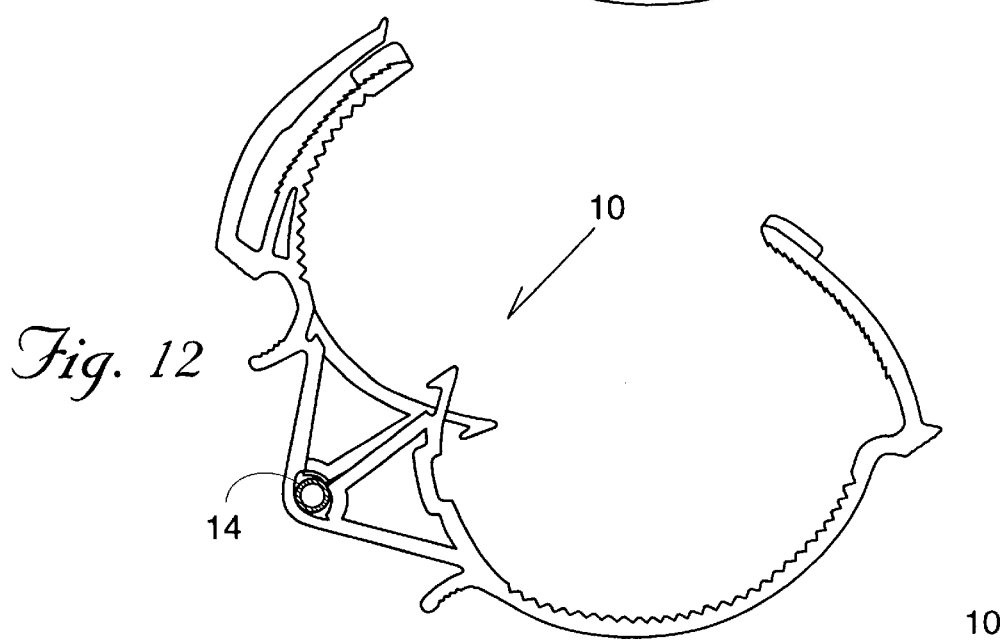
Figure 13:
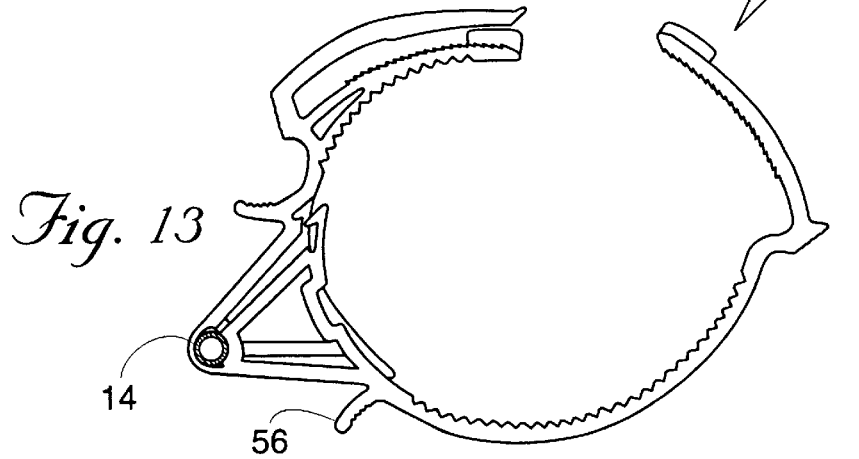

After the brakeline 14 is so positioned, the clamp 10 is flexed around the hinge 48 to encircle the brakeline 14 and bring the support legs 24 and 26 toward each other as shown in FIGS. 12 and 13. As the support legs move toward each other, the collar portions 50 close around the brakeline 14. When the support legs reach the position shown in FIG. 13, the beveled forward faces of the hooks 40 engage the opposite sides of the clamp 10, thereby causing the support legs 24 and 26 to flex outwardly slightly and allowing the hooks to snap into the pocket 42, as best seen in FIG. 14. Preferably, the portions of the support legs 24 and 26 immediately adjacent the hooks 40 are thinned or otherwise made flexible to facilitate this snapping action. The finger or tool grips 56 can be squeezed together to move from the condition shown in FIG. 13 to that shown in FIG. 14. When the support legs 24 and 26 are fully snapped together, the brakeline snugly secured between the collar portions 50 and the hinge portion 48. When so attached, the clamp 10 can remain on the brakeline 14 until such time as it is mounted around the axle 12.

When it becomes time to secure the brakeline 14 to the axle 12, the clamp 10 is wrapped around the axle 12 and the beam 32 is inserted between the jaws 28 and 30 as illustrated in FIGS. 12–15. Although these FIGURES show the support legs as not being snapped together at this time, it will be appreciated that the support legs 24 and 26 can, if desired, be snapped into place around the brakeline 14 long before the clamp 10 is brought to the axle 12. There is sufficient flexibility in the clamp 10 to enable it to be positioned around the axle 12 even when the support legs 24 and 26 are fully snapped together.

After the clamp 10 is positioned around the axle 12 and the beam 32 inserted between the jaws 28 and 30, the grips 58 can be squeezed together to fully tighten the clamp around the axle 12. The angled, interlocking serrations 36 and 38 formed on the adjacent surfaces of the beam 32 and the lower jaw 30 provide a ratcheting action that enables the clamp 10 to be easily tightened onto the axle 12, but not loosened.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A clamp for supporting an elongate element adjacent and spaced from a primary supporting member, comprising:
   a flexible band having first and second end portions shaped and dimensioned to encircle the primary supporting member and further having substantially symmetrical interlocking support legs positioned between and integrally formed with the first and second end portions and shaped and dimensioned to encircle the elongate element;

a secondary latch structure integrally formed on the interlocking support legs for securing the support legs to each other to secure the support legs to the elongate element;

a primary latch structure integrally formed on the first and second end portions for securing the first and second end portions to each other to secure the flexible band around the primary supporting member with the elongate element supported by the interlocking support legs spaced from the primary supporting member; and said secondary latch structure being independently operable from said primary latch structure so that said elongate element can be secured between said support legs before the clamp is secured around said primary supporting member.

2. A clamp as defined in claim 1 wherein said flexible band includes on the inner surface thereof, a plurality of transverse anti-rotation ridges, engagable with said primary supporting member.

3. A clamp as defined in claim 2 wherein a substantially continuous surface extending between the first and second end portions is formed when the secondary latch structure is engaged.

4. A clamp as defined in claim 3 wherein the support legs extend outwardly from the substantially continuous surface and thereby space the elongate element from the primary supporting member.

5. A clamp as defined in claim 4 wherein the interlocking support legs each include a collar portion shaped and dimensioned to engage the elongate element.

6. A clamp as defined in claim 5 wherein the clamp further includes a hinge portion between the interlocking support legs and wherein the hinge portion and the collar portions of the interlocking support legs fully encircle the elongate element when the secondary latch structure is engaged.

7. A clamp as defined in claim 6 wherein the collar portion includes structure for snugly engaging the elongate element when the collar portion encircles the elongate element and the secondary latch structure is engaged.

8. A clamp as defined in claim 7 wherein the structure for snugly engaging the elongate element comprises a crush tab.

9. A clamp as defined in claim 8 wherein the crush tab comprises an arcuate, radially inwardly directed segment of reduced thickness integrally formed on at least one of the collar portions.

10. A clamp for supporting an elongate element adjacent and spaced from a primary supporting member, comprising:

a flexible band having first and second end portions shaped and dimensioned to encircle the primary supporting member and further having substantially symmetrical interlocking support legs positioned between and integrally formed with the first and second end portions and shaped and dimensioned to encircle the elongate element;

a secondary latch structure integrally formed on the interlocking support legs for securing the support legs to each other to secure the support legs to the elongate element;

a primary latch structure integrally formed on the first and second end portions for securing the first and second end portions to each other to secure the flexible band around the primary supporting member with the elongate element supported by the interlocking support legs spaced from the primary supporting member;

said primary latch structure comprising an interlocking jaw assembly carried by the first and second end portions;

said clamp further comprising anti-release structure for resisting disengagement of the interlocking jaw assembly after the interlocking jaw assembly is engaged; and said interlocking jaw assembly including a pair of opposed jaws formed at one of the first and second end portions therebetween.

11. A clamp as defined in claim 10 wherein the anti release structure includes a tab on one of the first and second ends for resisting sideways movement of the first and second ends relative to each other after the interlocking jaw assembly is engaged.

12. A clamp for supporting an elongate element adjacent and spaced from a primary supporting member, comprising:

a flexible band having first and second end portions shaped and dimensioned to encircle the primary supporting member and further having substantially symmetrical interlocking support legs positioned between and integrally formed with the first and second end portions and shaped and dimensioned to encircle the elongate element;

a secondary latch structure integrally formed on the interlocking support legs for securing the support legs to each other to secure the support legs to the elongate element;

a primary latch structure integrally formed on the first and second end portions for securing the first and second end portions to each other to secure the flexible band around the primary supporting member with the elongate element supported by the interlocking support legs spaced from the Primary supporting member;

said interlocking support legs being coupled to each other through a flexible hinge portion that flexes around the elongate element when the interlocking support legs are positioned around the elongate element;

each of said interlocking support legs including a substantially circumferentially extending portion that extends substantially circumferentially around the primary supporting member when the flexible band is secured around the primary supporting member; and said secondary latch structure comprising a hook structure disposed at the end of each circumferentially extending portion of each interlocking support leg.

* * * * *